Sept. 6, 1966   R. H. GEORGE   3,271,084
AUTOMATIC BRAKE VALVE
Filed June 30, 1964   2 Sheets-Sheet 1

FIG. 1

INVENTOR.
ROBERT H. GEORGE
BY
ATTORNEY

Sept. 6, 1966 R. H. GEORGE 3,271,084
AUTOMATIC BRAKE VALVE
Filed June 30, 1964 2 Sheets-Sheet 2
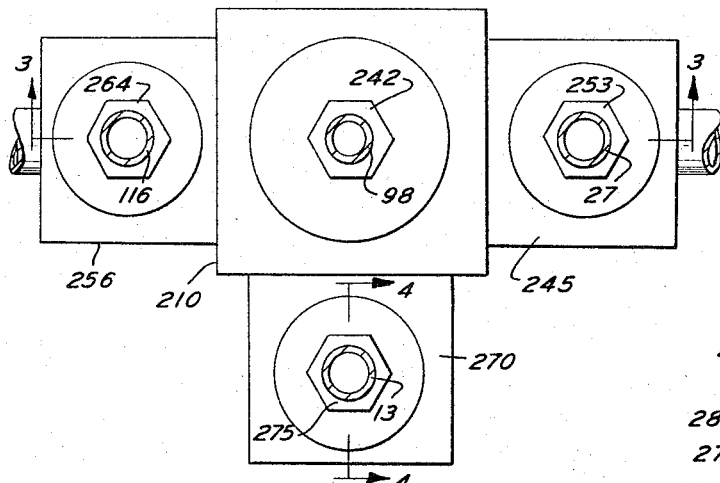
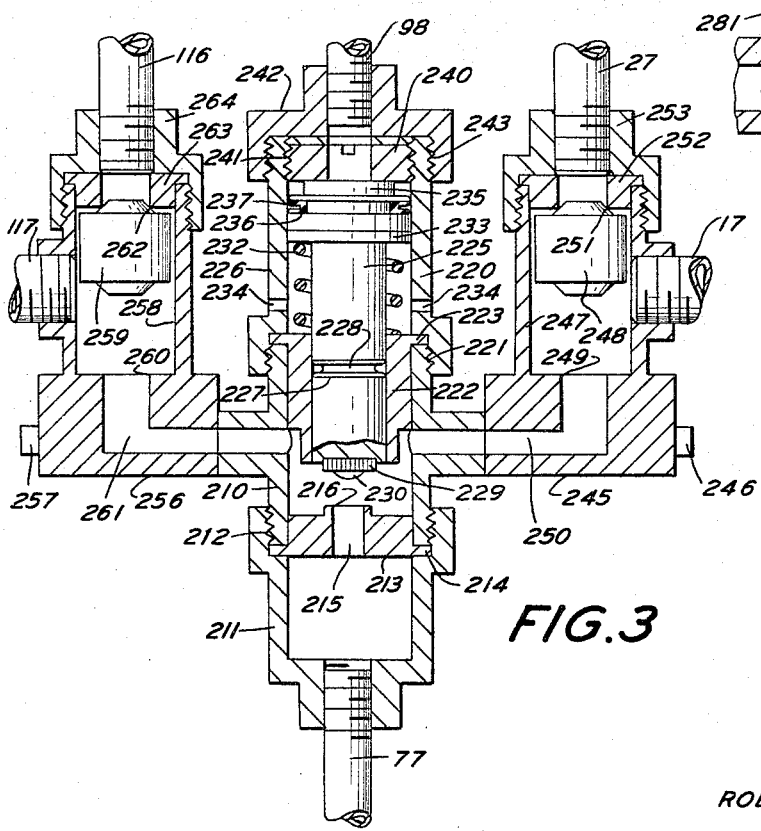
INVENTOR.
ROBERT H. GEORGE
BY
ATTORNEY

United States Patent Office 3,271,084
Patented Sept. 6, 1966

3,271,084
AUTOMATIC BRAKE VALVE
Robert H. George, Melrose Park, Pa., assignor to Brakmaster Corporation, Philadelphia, Pa., a corporation of Pennsylvania
Filed June 30, 1964, Ser. No. 379,173
6 Claims. (Cl. 303—8)

This invention relates to automatic brake control valves and more particularly to improvements in the automatic brake valves employed in connection with the automatic air brake system of my prior Patent No. 3,106,430.

It is the principal object of the present invention to provide an improved automatic brake valve which gives more positive automatic brake application than heretofore.

It is a further object of the present invention to provide an improved automatic brake valve which relies for its control solely on the tractor reservoir or tank pressure and does not rely for control on the emergency air pressure.

It is a further object of the present invention to provide an improved automatic brake valve of the character aforesaid which is simple in construction and reliable in operation.

It is a further object of the invention to provide an improved automatic brake valve having components positioned by fluid pressure and not subject to change in position by vibration from shock by travel over rough roadways.

It is a further object of the invention to provide an automatice brake valve which is suitable for use on single vehicles such as trucks, buses, or carriers and various types of construction vehicles and machinery.

Other objects and advantageous features of the invention will be apparent from the description and claims.

The nature and characteristic features of the invention will be more readily understood from the following description taken in connection with the accompanying drawings forming part thereof, in which:

FIGURE 1 is a diagrammatic view of an air brake system for automotive vehicles of the tractor trailer type having the brake control valve of the present invention incorporated therein;

FIG. 2 is a top plan view of an automatic brake valve in accordance with the invention;

FIG. 3 is a vertical central sectional view taken approximately on the line 3—3 of FIG. 2; and FIG. 4 is a transverse sectional view taken approximately on the line 4—4 of FIG. 2.

It should, of course, be understood that the description and drawings herein are illustrative merely, and that various modifications and changes can be made in the structure disclosed without departing from the spirit of the invention.

Like numerals refer to like parts throughout the several views.

In my prior Patent No. 3,106,430 there is shown and described an automatic air brake system including circuit integrity testing. The background structure as therein set forth is herein included for purposes of explanation, the valve of the present invention being employed in place of the valve ABV therein described.

Referring to the drawings, in the particular embodiment of the invention therein shown, the general arrangement of the brake system is in many respects similar to that commonly used in heavy automotive vehicles and particularly those inwhich detachable trailers are employed in connection with tractors, the trailer braking system being coupled to the tractor braking system when the tractor and trailer are used together. With the exception particularly of the automatic brake control valve of the present invention, numerous other parts may be the same as or are similar to those at present in common use in heavy vehicle braking systems or as described in my prior Patent No. 3,106,430.

Referring now more particularly to FIG. 1 of the drawings, there is provided an air compressor or pump P with an aftercooler 8 and a pair of tractor reservoir tanks T1 and T2 for receiving the air delivered through the aftercooler 8 from the compressor or pump P to an automatic by-pass valve BPV through a check valve 10. The valve BPV is connected by a pipe line 9 to the reservoir tank T1 which is connected to the reservoir tank T2 by a pipe 11, a non-return or check valve 12 being interposed in the pipe 9 in advance of the tank T1.

A governor G connected to the tank T2 by a pipe 7 is responsive to the pressure in the tank T2 and has a pipe line 13 connected thereto, and an operating line 6 to the pump and to an unloader 5.

The tractor front wheels (not shown) are provided with right hand and left hand air operated brakes 14, connected by pipe lines 15 to a quick release valve 16 of well known type, and with tractor service pipe line 17 leading to the valve 16.

The tractor rear wheels (not shown) can also be provided with right hand and left hand front and rear air operated brakes 18 connected by pipe lines 19 to a relay valve 20 of well known type, and with the tractor service pipe line 17 connected thereto. The pipe line 17 is connected to an automatic brake valve ABV shown in detail in FIGS. 2, 3 and 4, and hereinafter more fully described.

The automatic brake valve ABV has the ordinary foot operated brake control valve 26 connected thereto by a pipe line 27. The foot operated brake control valve 26 is connected by a supply pipe line 25 to a supply pipe 28 extending to the tank T2, and a non-return or check valve 29 is interposed in the line 28.

A hand operated control valve 31, connected by the supply pipe line 25 to the supply line 28, can also be provided on the tractor to permit of the operation of the trailer brakes independently of the tractor brakes. The valve 31 is also connected to the automatic brake valve ABV and therethrough to the trailer brakes 36 as hereinafter explained.

A brake release valve RV, shown in detail in my prior Patent No. 3,106,430 for releasing the automatic brake valve ABV, can be provided between the pipe line 28 and the automatic brake valve ABV although for some types of installation, and where no overriding of the automatic brake application is to be permitted will not be utilized.

The trailer, which is adapted to be coupled to the tractor or uncoupled therefrom as desired, is ordinarily provided with a reservoir tank T3. Right- and left-hand air-operated trailer brakes 36 are connected by pipes 37 to an emergency relay valve 38 of known type to which the tank T3 is connected by a pipe 34 which may have a pressure regulator and check valve 35 therein to cause the trailer brakes to be applied up to the regulator setting before starting to charge the tank T3. Such a pressure regulator and check valve is shown in detail in FIG. 3 of my prior Patent No. 2,930,658 and in FIG. 4 of my prior Patent No. 2,938,753.

The relay 38 has the brake service line 39 and the emergency feed line 40 connected thereto.

In air brake systems for heavy vehicles as heretofore provided, it was customary to connect the air compressor directly to the main reservoir tanks but in my prior U.S. Patent Nos. 2,938,753 and 3,106,430, provisions are made by bypassing the air from the compressor directly to the brakes under certain predetermined conditions.

As shown in FIG. 1 of the drawings the automatic bypass valve BPV is provided for bypassing the air from the compressor P directly to the brakes under certain conditions at the commencement of building up of pressure, and subsequently if the pressure in the reservoir tanks T1 and T2 falls below a predetermined value.

The automatic bypass valve BPV for this purpose is shown in detail in my prior Patent No. 3,106,430.

The valve BPV has a pipe line 49 extending thereto through check valve 10 from the aftercooler 8 and also has the pipe 9 from the tractor reservoir T1 connected thereto, has a vent 58 to the atmosphere, and has a fluid connection 69 extending to the connection of the pipe 25 and the pipe 28 and accordingly directly to the brake system.

When sufficient pressure is applied at the valve BPV through the pipe 49 in series with the check valve 10 air flows therefrom into the reservoir T1 through the pipe 9 for charging as well as through the pipe 69.

The valve BPV can have a pressure relief valve 70 connected thereto as shown in my prior Patent No. 3,106,430, the pressure relief valve 70 opening upon the attainment of an excessive pressure to prevent damage.

The automatic brake valve ABV in accordance with the present invention is shown in more detail in FIGS. 2, 3 and 4 of the drawings.

The automatic brake valve ABV, includes a central valve body 210 having a connection cap 211 in threaded engagement with the lower end thereof at 212. A fixedly mounted valve seating member 213 is provided having a rim 214 for holding it in engagement between the body 210 and cap 211 when the same is tightened in threaded engagement. The valve seating member 213 has a central opening 215 with a valve seat 216 therearound.

The cap 211 has a fluid connection 77 for communicating with the central opening 215, to which a release valve such as the valve RV of my prior Patent No. 3,106,430 is connected for manual release of pressure for release of the brakes.

The valve body 210 has an upper body section 220 in threaded engagement with the body section 210 at 221. The valve body 210 has a sleeve 222 mounted therein and held in position by an outwardly extending rim 223 retained in engagement between the body 210 and the upper body section 220, when the same are in tightened threaded engagement.

A valve spindle 225 is provided, vertically movable within the sleeve 222 and has a central body portion 226 with an annular groove 227 for the reception of a packing 228 for preventing fluid leakage. The central body portion 226 has, at one en dthereof, a seating washer 229 held in place by a screw 230, the washer 229 being adapted to engage the valve seat 216.

The upper body section 220 is of greater internal diameter than the interior of the sleeve 222 for the reception of a compression spring 232, which may be a calibrated spring, and which engages the upper face of the sleeve 223 and the lower face of an enlarged head 233 on the spindle 225. The spring 232 urges the washer 229 from the seat 216.

The upper body section 220 is provided with vents 234 for preventing fluid locking upon movement of the valve spindle 225.

An adjustable stop 235 is provided for limiting movement of the valve piston 225 having an annular groove 236 with a packing 237 therein for preventing fluid leakage. The upper end of the stop 235 is relieved. The stop 235 is positioned by an adjusting nut 240 in threaded engagement at 241 with the interior of the upper body section 220. The positioning of the nut 240 determines the position of the valve piston 225 and the force applied by the spring 232.

The upper end of the upper body section 220 is closed by a cap 242 in threaded engagement at 243 with the exterior of the upper body section 220.

The cap 242 has a fluid connection 98 connected thereto which extends to and has pressure supplied thereto from the tractor reservoir of the brake system.

The valve body 210 has a side body portion 245 on one side thereof held in position in any desired manner, such as by cap screws 246. The side body portion 245 has a cylinder bore 247 within which the spindle 248 of a double acting check valve is mounted and adapted to be seated at 249 in a lower position to shut off communication between the lower end of the cylinder bore 247 and a passageway 250 communicating with the interior of the valve body 210 below the sleeve 222. The spindle 248 can also be seated at 251 in an upward position to shut off communication at the upper end of the cylinder bore 247, in which a seating bushing 252 is retained by a cap 253. The cap 253 has the pipe 27 connected thereto which extends from the foot operated brake control valve 26 of the brake control system for pressure delivery for brake applications. A connection 17 is also provided to the bore 247 which acts as the tractor service pipe of the brake control system for controlled air pressure delivery to the tractor brakes.

The valve body 210 has a side body portion 256 on one side thereof held in position in any desired manner, such as by cap screws 257. The side body portion 256 has a cylinder bore 258 within which the spindle 259 of a double acting check valve is mounted and adapted to be seated at 260 in a lower position to shut off communication between the lower end of the cylinder bore 258 and a passageway 261 communicating with the interior of the valve body 210 below the sleeve 222. The spindle 259 can also be seated at 262 in an upward position to shut off communication at the upper end of the cylinder bore 258, in which a seating bushing 263 is retained by a cap 264. The cap 264 has a pipe 116 connected thereto which extends from the hand operated brake control valve 31 of the brake control system for pressure delivery for brake application. A connection 117 is also provided to the bore 258 communicating with the trailer service pipe 40 of the brake control system for controlled air pressure delivery to the trailer brakes through the usual relay valve on the trailer.

Both check valve with their spindles 248 and 259 are required for tractor trailers, and these can also be connected respectively, to the front and rear wheel brakes of a single vehicle for faster brake operation and faster brake release, although a single vehicle, such as a truck or bus, could employ only a single double acting check valve at this location for simultaneous front and rear brake operation.

A double acting check valve 118 is provided in the line 116 and a pipe 119 from the foot operated brake control valve 26 can also be connected to the valve 118.

The central valve body 210 has another side body portion 270 on another side thereof held in position in any desired manner, such as by cap screws 271. The side body portion 270 has a valve bore 272 therein with an opening 273 at the lower end thereof communicating through a passageway 274 with the interior of the valve body 210 below the sleeve 222. The body portion 270 has, at the upper end thereof, a cylinder cap 275 in threaded engagement therewith at 276. The cylinder cap 275 retains a guide and seat bushing 277 in position for guiding a valve spindle 278. The valve spindle 278 has guiding ribs 279 in slidable engagement with the bore 272 in the lower part of the body portion 270, a guiding rim 280 provided with a plurality of notches 281 for fluid flow, a seating portion 282 to seat on the bushing 277 and a plurality of ribs 283 for guiding the spindle 278 in the bushing 277.

A piston 284 is slidably mounted in the cylinder cap 275 and is normally urged from engagement with the spindle 278 by a spring 285 of predetermined spring rate which engages the piston 284 at one end and is in engagement at the other end with the bushing 277.

The piston 284 has a packing 286 for preventing fluid leaking past the piston 284.

A vent 287 is provided from the interior of the cylinder cap 275 below the lowermost position of the piston 284 and in communication with the atmosphere. The cylinder cap 275 has a fluid connection 13 to the governor G for supplying pressure against the upper end of the piston 284 and delivered through the governor G when a predetermined pressure is applied at the governor G from the tractor reservoir T2 of the brake system.

The manually operable automatic brake release valve RV with its operating lever 164, as shown in my prior Patent No. 3,106,430 can also be employed with its connection to the pipe 28, its connection to the valve ABV by the pipe 77 and with its vent 166 to atmosphere.

The manually operable automatic brake valve release valve RV and its operating valve 164 are preferably placed at an accessible but not too convenient location, so that a conscious effort is required for operation of the lever 164.

A service line breakaway or tractor protection valve 170 can be provided in the service line 39 with a connection to the automatic brake valve ABV and an emergency line breakaway or tractor protection valve 170 can be provided in the emergency feed line 40, with a control valve 172 therefor connected to the pipe 28 which extends to the relay valve 20 for air supply thereto.

The valves 170 and 171 are adapted to open at predetermined pressure levels, say 60 and 65 p.s.i. to supply air under pressure to the emergency feed line 40 and to the relay valve 38 for brake application.

The pipe 28 can, if desired, have the conventional retarder control valve 174 and retarder 175 connected thereto.

Other conventional equipment employed in connection with tractor trailers can be employed including air operated auxiliaries connected to the reservoir T2 by a pipe 176.

The mode of operation will now be pointed out.

Assume that there is no pressure in the system, either because of a leak or leaks that have been repaired or for some other reason.

At starting up automatic bypass valve BPV by reason of the low pressure initially effective therein will be in a bypassing position.

Upon operation of the pump or compressor P air from the compressor or pump P will be supplied through the aftercooler 8 and the check valve 10 to the automatic bypass valve BPV and through the pipe 69 to the pipe 28.

From the pipe 28, fluid under pressure will be supplied through the pipe 28 and to the relay valve 20 to condition the relay 20 for brake application. From the pipe 28 fluid under pressure will be supplied through the valve RV, the pipe 77, the valve ABV and to and through the pipe 17 to activate the relay valve 20 to apply the brakes 18. Fluid will also be effective through the pipe 17 to the quick release valve 16 and therefrom through the pipes 15 for applying the brakes 14.

The check valve 29 prevents flow therebeyond to the pipe 23, the closed condition of the foot operated brake control valve 26 prevents flow therebeyond, and the closed condition of the hand operated brake control valve 31 prevents flow therebeyond.

The supply of pressure fluid to the relay 20 continues until a first predetermined pressure level is reached, say of the order of 60 p.s.i.

At a predetermined higher pressure level, say of the order of 65 p.s.i., the emergency breakaway valve 171 opens and air under pressure is supplied to and through the trailer emergency service line 40 to the emergency relay valve 38 and therefrom through the pipes 37 to set the trailer brakes 36.

The pressure effective through the breakaway valve 171 is also then effective for controlling the service line breakaway valve 170 so that air can pass therethrough to the trailer service line 39.

The brakes 18 and 14 of the tractor and the brakes 36 of the trailer remain held in set condition. The pressure continues to increase and continues to be applied against the tractor brakes 14 and 18 and the trailer brakes 36. The trailer brake reservoir T3 is charged with air under pressure.

The pressure is increased up to a desired test pressure level, assumed for purposes of description as 140 p.s.i. This test pressure is applied for pressure testing the diaphragms of the brakes 36, of the brakes 18 and the brakes 14, and for pressure testing the pipes 39 and 40 and the hose connections therein and other devices, including auxiliaries, connected thereto.

As the pressure level is rising, but before the test pressure level has been attatined, air under pressure is effective from the pipe 28 through the release valve RV in non-venting position, and the pipe 77 to the automatic brake valve ABV from which it passes the valve plug 229 and moves through the passageways 250 and 261 for delivery to the tractor service line 17 and through the pipe 117 to the brake service line 39. The valve plugs 248 and 259 will permit this flow and also prevent back flow to the pipes 27 and 116. The valve plug 282 closes as soon as pumping commences and prevents discharge through the vent 287.

When the pressure at the bypass valve BPV reaches a predetermined level, fluid is delivered through the pipe 9 to charge the reservoirs T1 and T2 with air under pressure. The pressure level at which the bypass valve BPV opens is the test pressure previously referred to and assumed at 140 p.s.i.

Air is thus supplied to the reservoirs T1 and T2 and when the pressure in the reservoir T2 reaches a predetermined level and preferably a level below the test pressure level, and which may be of the order of 120 p.s.i., this pressure is effective through the pipe 24 and the pipe 7 and at the governor G. This pressure may be referred to as a governor actuating pressure level. When the governor actuating pressure level is effective at the governor G, the governor G is opened and this is effective in a well known manner for stopping further delivery from the pump P while at the same time air is delivered through the pipe 13 to the automatic brake valve ABV and against the piston 284 to move the same downwardly against the force of the spring 285 and the upward fluid pressure effective thereon to force the valve seating portion 282 to open position with respect to its seat on the bushing 277. A connection to the atmosphere is thus provided through the vent 287. Air under pressure from the passageway 274, the interior of the body 210 and the passageways connected thereto is effective for venting the tractor service line 17 and the trailer service line 39 connected to the valve 26 by the line 117 through the breakaway valve 170. The venting of the pressure in these lines effects a release of the brakes of both the tractor and the trailer.

The system is now in condition for normal operation.

The foot-operated brake control valve 26 may be manipulated in the usual manner for supplying air from the pipe 25 through the pipe 27 and through the valve ABV and pipe 17 to the relay 20 for operating the tractor brakes 14 and 18 and through the pipe 119, the double acting check valve 118, the pipe 116 to the valve ABV and through the pipe 117 and the valve 170 to the pipe 39 for operating the trailer brakes 36. The valve 26 can also exhaust air under pressure from the pipe 27 and the parts connected thereto for normal brake release.

The hand operated brake control valve 31 may be manipulated in the usual manner for supplying air from the pipe 25 through the double acting check valve 118, the pipe 116, the valve ABV, the pipe 117, and the valve 170 to the service line 39.

The valve 31 can also exhaust air under pressure for normal brake release.

If during operation, the tractor reservoir pressure available in the tank T2 should drop to a predetermined level, say of the order of 60 p.s.i., this decrease in pressure is effective on the piston 225 of the valve ABV so that the valve plug 229 is moved from its seat on the ring 212 by the spring 232. The effective pressure level for such operation can be determined by the spring rate of the spring 232 and the setting of the adjusting nut 240.

The valve 282 also closes so that pressure is applied through the pipe 117 and the service line 39 to apply the trailer brakes 36. At the same time air under pressure is applied through the tractor service line 17 to apply the tractor brakes 14 and 18. It will be noted that this application of the brakes is automatically effected, independent of the volition of the operator.

Since the automatic brake application just described may occur at some undesired location along the road, such as in a tunnel or on a narrow bridge, the automatic brake valve release valve RV is provided so that by manual manipulation of the lever 164, and only as long as the lever 164 is held down, air under pressure is exhausted therethrough from the pipe 77 and the automatic brake valve ABV to temporarily overcome the effect of the action of that valve in supplying air for brake application. Movement of the vehicle can thus be effected in a restricted fashion so that the vehicle can be moved to a location for checking and repair.

Upon starting up again, the sequence previously described will be effective.

The automatic brake control valve ABV is also effective with the valve 171 to prevent a high pressure trailer brake application during the changeover from normal air supply to emergency air supply.

The valve 171 is effective to open at predetermined pressure, assumed at approximately 65 p.s.i., to charge the pipe 40, and to close and vent pipe 40 when the pressure drops to that point. Such a high pressure brake application could occur but in the operation of the present system the pressure on the piston 225 controlled by reservoir pressure drops, say to 50 p.s.i., opening the valve plug 229 from the seat 216 so that air flows and automatic brake application is effected. The bypass valve BPV closes at the same time thus delivering emergency air pressure to the pipe 28 to be effective against all the brakes.

Under normal operating conditions, when the system is fully charged, and when a brake application is made by either the valve 26 or by the valve 31, air will flow from two sources, i.e., from the reservoir T2 through the check valve 29 to the pipe 28 and also into the pipe 69. By the use of these two sources of supply, it has been determined that the number of brake applications that can be made before the pressure in the reservoir T2 is depleted to the level to operate the valve ABV is greatly increased.

At any time the pressure in the system and that effective on the bypass valve BPV falls to say 60 p.s.i. valve BPV is positioned for direct supply of air for automatic brake application.

The brake control valve ABV as herein described has an effective action under conditions which occur in operation.

In the event of a drop in pressure in the line 28 for any reason this pressure drop will not affect the supply of air by the valve ABV since the pressure in the tank or reservoir T2 is the determining factor. In my prior Patent No. 3,106,430, a decrease in this pressure had a great effect. Accordingly if the pressure in pipe 28 decreases with the pressure below normal operating pressure the tank pressure is more reliable for control purposes.

I claim:
1. A brake control valve interposed between the fluid pressure supply and storage and the fluid pressure operated brakes comprising
a valve body with a movable valve member therein having a valve seating portion,
said valve body having a fluid space therein,
a fixed valve seat in said body at a boundary of said fluid space for engagement by said valve seating portion,
a fluid connection for applying the pressure from a brake operating storage tank for moving said valve member toward seated position on said fixed seat,
a resilient member for normally urging said valve member away from said fixed seat,
a venting valve communicating with said fluid space,
a fluid pressure responsive member for actuating said venting valve,
a fluid connection for applying the pressure from a supply of fluid pressure against said pressure responsive member for opening said venting valve,
said valve body having a bore in offset relation to the movable member,
one end of said bore having a valve seat and being in communication with said fluid space,
the other end of said bore having a valve seat and being in communication with an operator controlled variable supply of brake operating pressure,
a brake operating delivery fluid connection in communication with said bore between said seats, and
a valve seating member seating on one of said seats as determined by the supply of fluid through the other of said seats.

2. A brake control valve as defined in claim 1 in which said valve body includes a central body portion, and
a lower closure cap aligned with and in engagement with said central body portion, and
a valve seating member held by said central body portion and said cap has said fixed valve seat therein.

3. A brake control valve as defined in claim 1 in which said valve body includes a central body portion, and
an upper body section aligned with and in engagement with said central body portion,
said movable valve member includes a piston and
a sleeve held by said central body portion and said upper body section has said piston movable therein.

4. A brake control valve as defined in claim 3 in which said piston has a head with which said resilient member is in engagement at one of its ends,
said resilient member being in engagement at the other of its ends with said sleeve.

5. A brake control valve as defined in claim 3 in which said upper body section has a closure cap to which said first fluid connection is connected.

6. A brake control valve as defined in claim 1 in which said valve body has an additional bore in offset relation to said movable valve member and said first bore,
said additional bore has at one end thereof a valve seat and is in communication with the fluid space,
said additional bore has at the other end thereof a valve seat and is in communication with a second operator controlled variable supply of brake operating pressure,
said additional bore has a brake operating delivery fluid connection in communication with said additional bore between said seats, and
an additional valve seating member is provided between said seats of said additional bore and seats on one of said seats as determined by the supply of fluid through the other of said seats,
one of said brake operating fluid connections supplying pressure fluid for tractor brake operation, and
the other of said brake operating fluid connections supplying pressure fluid for trailer brake operation.

References Cited by the Examiner
UNITED STATES PATENTS
3,106,430  10/1963  George _____ 303—8

EUGENE G. BOTZ, *Primary Examiner.*